US 9,969,258 B1

(12) United States Patent
Hauser (10) Patent No.: US 9,969,258 B1
(45) Date of Patent: May 15, 2018

(54) TRANSAXLE FOR ZERO-TURN VEHICLE (71) Applicant: Hydro-Gear Limited Partnership, Sullivan, IL (US)

(72) Inventor: Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 24 days.

(21) Appl. No.: 14/692,970

(22) Filed: Apr. 22, 2015

Related U.S. Application Data (60) Provisional application No. 61/982,785, filed on Apr. 22, 2014.

(51) Int. Cl.
 B62D 6/00 (2006.01)
 B60K 17/10 (2006.01)
 B62D 11/10 (2006.01)
 A01D 69/06 (2006.01)

(52) U.S. Cl.
 CPC ............ B60K 17/105 (2013.01); A01D 69/06 (2013.01); B62D 11/10 (2013.01)

(58) Field of Classification Search
 CPC ........ B62D 11/08; B62D 11/10; B60K 17/105
 USPC .......................................................... 180/6.2
 See application file for complete search history.

(56) References Cited

U.S. PATENT DOCUMENTS

| | | | |
|---|---|---|---|
| 2,423,266 A * | 7/1947 | Stokes ................. | B60K 17/358 180/240 |
| 3,065,700 A | 11/1962 | Blenkle | |
| 3,666,036 A * | 5/1972 | Scerbo ................. | B60K 17/043 180/233 |
| 3,728,909 A | 4/1973 | Jespersen | |
| 3,765,258 A | 10/1973 | Jespersen | |
| 3,776,325 A | 12/1973 | Jespersen | |
| 3,930,550 A * | 1/1976 | Rose ..................... | B60G 11/23 180/24.08 |
| 4,116,292 A | 9/1978 | Todeschini et al. | |
| 4,132,278 A | 1/1979 | Todeschini | |
| 4,454,925 A * | 6/1984 | Oswald .................... | B60G 5/01 180/22 |
| 4,572,311 A * | 2/1986 | Oswald ................ | B60K 7/0007 180/24.05 |
| 4,595,069 A * | 6/1986 | Oswald .................... | B60G 5/01 180/24.02 |
| 4,600,069 A * | 7/1986 | Oswald .................. | B60K 17/32 180/24.02 |
| 4,809,796 A | 3/1989 | Yamaoka et al. | |
| 4,878,339 A * | 11/1989 | Marier .................. | A01D 34/64 180/19.1 |
| 4,969,530 A * | 11/1990 | Kopczynski ........... | B60K 17/32 180/24.05 |
| 5,078,222 A | 1/1992 | Hauser et al. | |
| 5,127,215 A | 7/1992 | Wenzel | |
| 5,392,670 A | 2/1995 | Hauser | |

(Continued)

OTHER PUBLICATIONS

U.S. Appl. No. 14/693,255, filed Apr. 22, 2015.
U.S. Appl. No. 62/058,577, filed Oct. 1, 2014.

Primary Examiner — Joseph M Rocca
Assistant Examiner — Conan D Duda
(74) Attorney, Agent, or Firm — Neal, Gerber & Eisenberg LLP (57) ABSTRACT A zero turn vehicle having an operator platform at the rear and a compact transmission design featuring a pair of transmissions disposed in a common housing and separate gear boxes permits a smaller, more efficient arrangement for the vehicle.

11 Claims, 5 Drawing Sheets (56) References Cited

U.S. PATENT DOCUMENTS

| | | | |
|---|---|---|---|
| 5,463,853 A * | 11/1995 | Santoli | A01D 34/001 280/32.7 |
| 5,507,138 A | 4/1996 | Wright et al. | |
| 5,564,518 A * | 10/1996 | Ishii | B60K 17/043 180/242 |
| 5,653,466 A * | 8/1997 | Berrios | A01D 34/64 180/19.1 |
| 5,743,347 A * | 4/1998 | Gingerich | B60L 8/00 180/2.2 |
| 5,809,755 A * | 9/1998 | Velke | A01D 34/001 180/19.3 |
| 5,809,756 A * | 9/1998 | Scag | A01D 34/001 280/32.7 |
| 5,918,691 A | 7/1999 | Ishii | |
| 5,957,229 A | 9/1999 | Ishii | |
| 6,089,341 A * | 7/2000 | Gingerich | B60L 8/00 180/2.2 |
| 6,105,463 A | 8/2000 | Sporrer | |
| 6,125,630 A | 10/2000 | Abend et al. | |
| 6,155,033 A | 12/2000 | Wians et al. | |
| 6,385,971 B1 * | 5/2002 | Abend | B60K 17/105 60/435 |
| 6,422,109 B1 * | 7/2002 | Jolliff | B60K 17/105 74/730.1 |
| 6,438,930 B1 * | 8/2002 | Velke | A01D 34/64 56/14.7 |
| 6,438,931 B1 * | 8/2002 | Velke | A01D 34/6806 56/14.7 |
| 6,442,917 B1 * | 9/2002 | Velke | A01D 34/6806 56/14.7 |
| 6,456,925 B1 * | 9/2002 | Romig | B60K 31/0075 701/110 |
| 6,484,827 B2 * | 11/2002 | Teal | B62D 11/183 180/6.2 |
| 6,490,849 B1 * | 12/2002 | Scag | A01D 34/001 56/10.8 |
| 6,497,422 B1 * | 12/2002 | Bellis, Jr. | B62D 49/065 280/32.7 |
| 6,499,282 B1 * | 12/2002 | Velke | A01D 34/6806 56/14.7 |
| 6,578,656 B2 | 6/2003 | Samejima et al. | |
| 6,658,831 B2 * | 12/2003 | Velke | A01D 34/64 56/14.7 |
| 6,668,965 B2 * | 12/2003 | Strong | B60B 33/0002 16/35 R |
| 6,672,058 B1 | 1/2004 | Langenfeld et al. | |
| 6,688,091 B2 | 2/2004 | Ishimori | |
| 6,717,281 B1 * | 4/2004 | Brandon | B60L 11/1807 180/65.245 |
| 6,758,290 B2 | 7/2004 | Jolliff et al. | |
| 6,775,976 B1 | 8/2004 | Phanco et al. | |
| 6,820,403 B2 | 11/2004 | Umemoto | |
| 6,843,056 B1 * | 1/2005 | Langenfeld | F16H 39/14 60/464 |
| 6,962,219 B2 * | 11/2005 | Hauser | B62D 11/006 180/6.34 |
| 6,964,317 B2 * | 11/2005 | Groves | B60G 3/145 180/344 |
| 7,017,327 B2 * | 3/2006 | Hunt | B60W 10/08 56/14.7 |
| 7,047,736 B1 * | 5/2006 | Langenfeld | F16H 39/14 60/464 |
| 7,134,276 B1 | 11/2006 | Langenfeld et al. | |
| 7,216,579 B2 * | 5/2007 | Oxley | B62D 11/06 91/491 |
| 7,240,759 B2 * | 7/2007 | Uemura | B60B 35/001 180/343 |
| 7,318,311 B2 * | 1/2008 | Wright | A01D 34/74 56/17.1 |
| 7,325,388 B2 * | 2/2008 | Wright | A01D 34/74 56/17.1 |
| 7,364,169 B2 * | 4/2008 | Velke | A01D 34/82 280/32.7 |
| 7,392,654 B1 * | 7/2008 | Hauser | F04B 1/324 60/484 |
| 7,454,908 B1 * | 11/2008 | Langenfeld | F04B 1/324 180/6.48 |
| 7,467,677 B2 * | 12/2008 | Barrier | A01D 34/824 180/6.32 |
| 7,527,285 B2 * | 5/2009 | Vachal | B62D 51/008 280/32.7 |
| 7,621,353 B2 | 11/2009 | Ishii et al. | |
| 7,644,524 B2 | 1/2010 | Azure et al. | |
| 7,841,044 B1 | 11/2010 | Weihl et al. | |
| 7,841,176 B1 * | 11/2010 | Langenfeld | F04B 1/324 60/435 |
| 7,992,659 B2 * | 8/2011 | Schaedler | B62D 7/08 180/6.2 |
| 8,104,552 B2 | 1/2012 | Papke et al. | |
| 8,141,886 B1 * | 3/2012 | Sugden | A01D 34/82 280/291 |
| 8,245,509 B1 * | 8/2012 | Langenfeld | F04B 1/324 180/6.48 |
| 8,387,205 B2 | 3/2013 | Weihl et al. | |
| 8,393,236 B1 * | 3/2013 | Hauser | F16D 55/24 74/11 |
| 8,517,159 B1 * | 8/2013 | Langenfeld | A01D 69/06 180/6.2 |
| 8,561,382 B2 * | 10/2013 | Gamble | A01D 34/64 56/14.7 |
| 8,613,342 B2 | 12/2013 | Jackson et al. | |
| 8,662,212 B2 * | 3/2014 | Lawson, Jr. | B60K 17/356 180/6.48 |
| 8,740,229 B2 * | 6/2014 | Ellsworth | A01D 34/64 180/282 |
| 8,844,658 B2 * | 9/2014 | Wyatt | B62D 3/02 180/443 |
| 8,950,520 B2 * | 2/2015 | Hauser | B62D 3/02 180/6.24 |
| 9,499,199 B1 * | 11/2016 | Laymon | B60K 6/46 |
| 2001/0001170 A1 * | 5/2001 | Velke | A01D 34/6806 56/14.7 |
| 2002/0115519 A1 * | 8/2002 | Thoma | B60K 17/105 475/198 |
| 2003/0019682 A1 * | 1/2003 | Schaedler | A01D 34/69 180/308 |
| 2004/0031629 A1 | 2/2004 | Walker | |
| 2004/0069553 A1 * | 4/2004 | Ohashi | B60K 7/0015 180/235 |
| 2004/0221559 A1 * | 11/2004 | Abend | A01D 34/6806 56/10.8 |
| 2005/0126843 A1 * | 6/2005 | Irikura | B60K 7/0015 180/305 |
| 2005/0205329 A1 * | 9/2005 | Fanger-Vexler | B60G 3/145 180/234 |
| 2006/0175098 A1 * | 8/2006 | Sutherland | A01D 34/64 180/6.24 |
| 2006/0237240 A1 * | 10/2006 | Crumly | A01D 34/6806 180/6.48 |
| 2007/0137194 A1 * | 6/2007 | Abend | A01D 34/69 60/487 |
| 2007/0137918 A1 | 6/2007 | Dong et al. | |
| 2007/0144167 A1 | 6/2007 | Abend et al. | |
| 2008/0277188 A1 * | 11/2008 | Hauser | B62D 3/02 180/422 |
| 2009/0065273 A1 * | 3/2009 | Wyatt | B60L 3/00 180/65.8 |
| 2010/0126792 A1 * | 5/2010 | Kallevig | B60K 26/00 180/315 |
| 2011/0278088 A1 | 11/2011 | Weihl et al. | |
| 2012/0000172 A1 * | 1/2012 | Papke | A01D 34/82 56/14.7 |
| 2012/0000173 A1 * | 1/2012 | Papke | A01D 34/82 56/14.7 |
| 2013/0074464 A1 | 3/2013 | Gindt et al. | |
| 2013/0074466 A1 * | 3/2013 | Zwieg | A01D 34/64 56/14.7 |

(56) References Cited

U.S. PATENT DOCUMENTS

| | | | |
|---|---|---|---|
| 2013/0264788 A1* | 10/2013 | Smyth | B62D 3/12 |
| | | | 280/98 |
| 2013/0316862 A1* | 11/2013 | Brandon | F16H 9/04 |
| | | | 474/69 |
| 2014/0059989 A1* | 3/2014 | Ishii | A01D 34/64 |
| | | | 56/10.2 A |
| 2014/0159332 A1* | 6/2014 | Dwyer | A01D 34/82 |
| | | | 280/93.514 |

* cited by examiner

TRANSAXLE FOR ZERO-TURN VEHICLE

CROSS-REFERENCE OF RELATED APPLICATION

This application claims the benefit of Provisional Application No. 61/982,785 filed Apr. 22, 2014, the disclosure of which is incorporated herein by reference

BACKGROUND OF THE INVENTION

This invention relates to transaxles generally and, in particular, transaxles intended for use in zero turn vehicles and similar applications, and to the vehicles for use therewith.

SUMMARY OF THE INVENTION

Transaxles adaptable to various zero turn vehicle configurations, and the related vehicles, are disclosed herein.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 1:
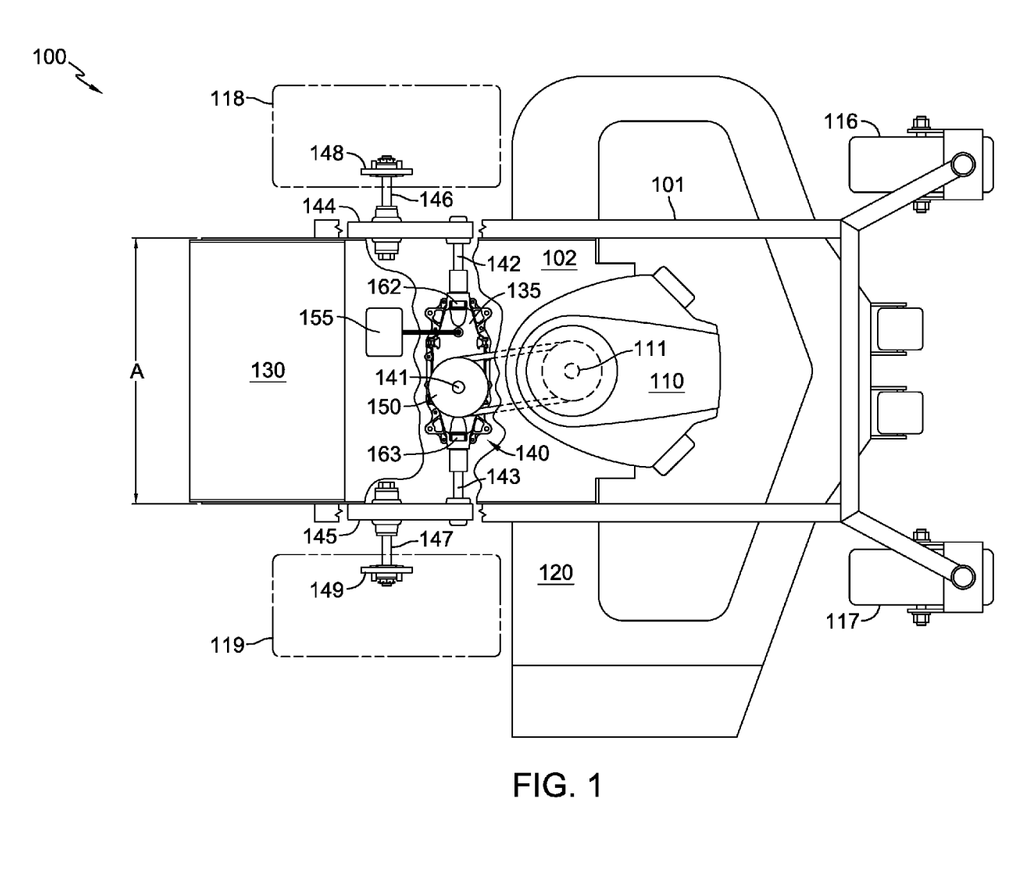
FIG. 1 is a partially schematic representation and partial cutaway of a zero turn vehicle having a transaxle adapted for use therein, the vehicle having several components removed for clarity.

FIG. 1 depicts a first embodiment of a zero turn vehicle 100, which by way of example only is a stand-on mowing vehicle. Vehicle 100 has a frame 101 supporting a plate 102 upon which a prime mover 110, such as the illustrated internal combustion engine or an electric motor (not shown), can be mounted with its output shaft 111 extending downward therethrough. Below plate 102 is mounted a transaxle 140 whose input shaft 141 is powered by the output shaft 111 of prime mover 110 via a belt and pulley assembly 150. Frame 101 further supports a mowing deck 120, which may be of fixed height (relative to ground), ground-following, or height adjustable as known in the art. An operator's foot platform 130, situated by way of example only behind transaxle 140, is also affixed to frame 101. Foot platform 130 may be stationary or folding as known in the art. Frame 101 is supported above ground by a pair of caster wheel assemblies 116, 117 and a pair of driven wheels 118, 119.

Transaxle 140 provides rotational output to driven wheels 118, 119 through a pair of output shafts, 142, 143 which power a set of gear boxes 144, 145, respectively, having output axles 146, 147 rotationally driving a pair of wheel hubs 148, 149, respectively. Transaxle 140 has a single input shaft 141 that drives a pair of independent transmissions (not shown) disposed in a single housing 135, which may be of a hydrostatic, toroidal, friction or gear design. As illustrated, transaxle 140 is of a hydrostatic design, having an external expansion tank 155 for hydraulic fluid. A pair of control arms 162, 163 regulate the rotational speed and direction of output shafts 142, 143, which via gear boxes 144, 145 impart the final rotation speed and direction to driven wheels 118, 119, respectively. In a typical zero turn vehicle, such regulation controls steering of the vehicle, as the front caster wheel assemblies 116, 117 merely react in response to the actions of the rear driven wheels 318, 319. An example of how a hydrostatic transmission, via closed loop pump and motor operation, regulates such output is described in commonly owned U.S. Pat. No. 7,134,276, the terms of which are incorporated herein by reference in their entirety. The control arms 162, 163 are operator controlled via mechanical linkages to hand controls (not shown) in a known manner. Depending upon the transmission design, output shafts 142, 143 may extend directly from the main housing 135 of transaxle 140, or represent an intermediate shaft flexibly coupled to the outputs (not shown) of the transmission, such as by cardan shaft interface or the like.

Figure 2:
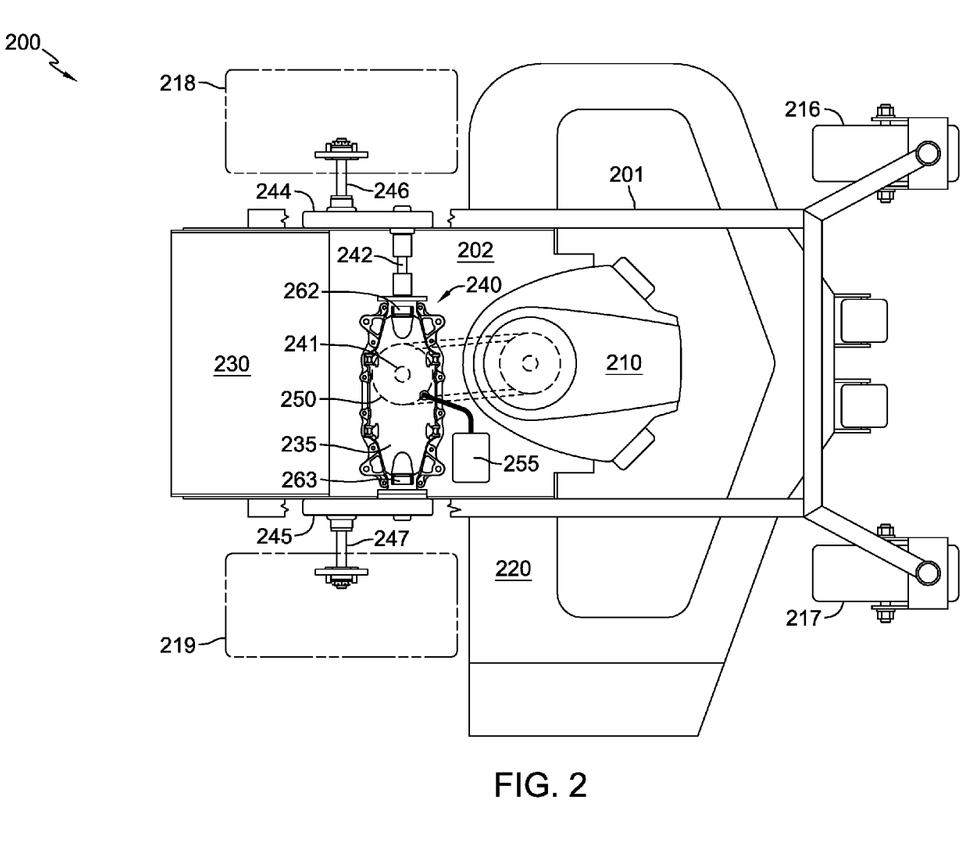
FIG. 2 is a partially schematic representation of a zero turn vehicle having a transaxle similar to that of FIG. 1 adapted for use therein and several components removed for clarity.

Gear boxes 144, 145 can be fixedly mounted to frame 101, or suspended therefrom, whereby gear boxes 144, 145 are allowed to pivot about output shafts 142, 143 in a sealed fashion. These gear boxes 144, 145 are generally slender in design and may contain either a spur gear reduction or chain and sprocket reduction. Because of this slender gear box design, the generally U-shaped configuration of transaxle 140 permits foot platform 130 to be located closer to the main housing 135 of transaxle 140 per the vehicle designer's needs. FIG. 2 illustrates such an alternate position, with the foot platform 230 disposed between the gear boxes 244, 245. In addition, the relative position of the main housing 135 of transaxle 140 can be adjusted within the width (demarked as 'A' in FIG. 1) of frame 101, per the needs of the vehicle's designer, by configuring the relative lengths of the output shafts 142, 143.

FIG. 2 depicts an embodiment of a zero turn vehicle 200 similar to vehicle 100, but differing in that the main housing 235 of transaxle 240 is positioned adjacent gear box 245. As such, the right side output shaft (not shown) is substantially shorter than left side output shaft 242, which may be useful in accommodating other vehicle components. In addition, the main housing 235 of transaxle 240 is mounted to the upper surface of plate 202, akin to the mounting of prime mover 210, wherein transaxle input shaft 241 extends downward therethrough to permit proper alignment of belt and pulley assembly 250. Alternately, transaxle 240 may be mounted to additional vehicle frame features (not shown) above the plane of plate 202. Having a pivotable, sealed interface between transaxle output shaft 242 and gear box 244, on the left side for example, permits the necessary downward angling of gear box 244 from above plate 202 to properly align output axle 246 with driven wheel 218. Expansion tank 255 is disposed in front of transaxle 240.

Figure 3:
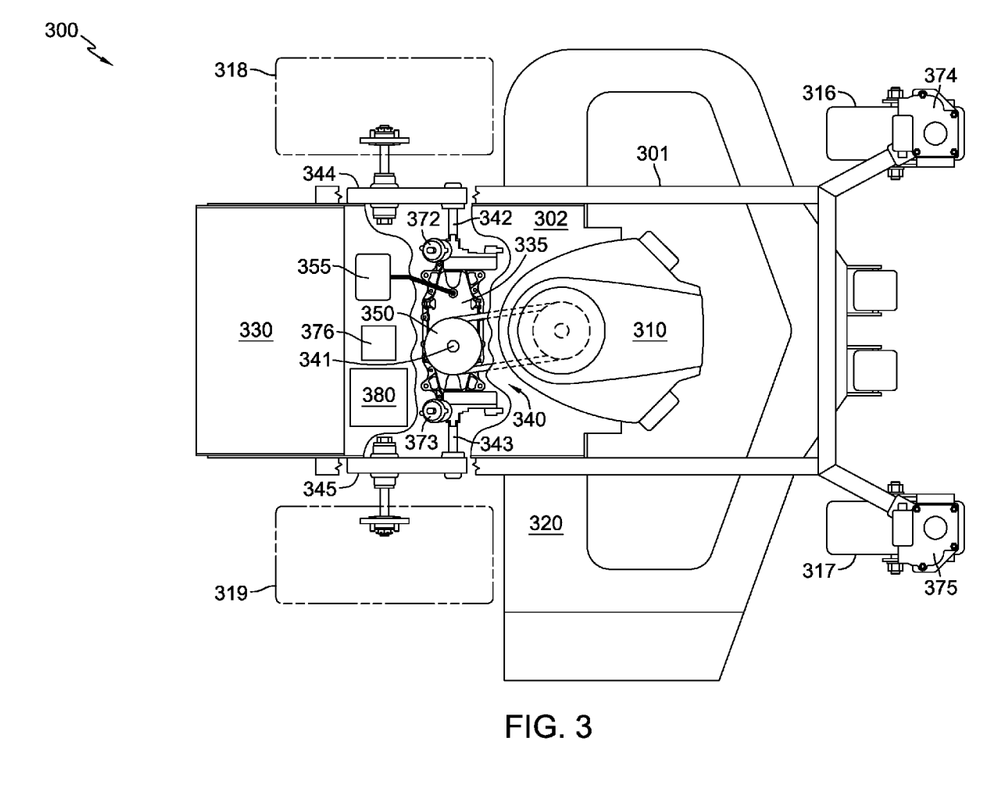
FIG. 3 is a partially schematic representation and partial cutaway of another zero turn vehicle having a transaxle similar to that of FIG. 1 adapted for use with electronic controls, the vehicle having several components removed for clarity.

FIG. 3 depicts an embodiment of a zero turn vehicle 300 similar to vehicle 100, but differing in that steering of vehicle 300 is accomplished electronically, via electric actuation of transmission control shafts (not shown). In the case of the previous embodiments, these control shafts were manipulated manually through operator linkages to the various control arms, 162, 163 and 262, 263 respectively. Electric actuators, such as the rotary actuators 372, 373 depicted in FIG. 3 are paired to the respective control shafts to similarly adjust the rotational speed and direction of output shafts 342, 343, and ultimately steered wheels 318, 319, respectively. Additionally, steering control can be added to caster wheel assemblies 316, 317 by means of a similar electric actuators 374, 375, respectively. Operator hand controls (not shown) communicate their relative positions to a controller 376 which coordinates the positioning of actuators 372, 373, 374, and 375 to improve the overall steering of vehicle 300. Front caster wheel assemblies 316, 317 are more immediately responsive to the actions of steered wheels 318, 319. A power source 380, such as a battery, alternator or generator, provides electric power to accomplish this coordinated steering control. As shown in FIG. 3, transaxle 340 includes a transaxle housing 335. As in the prior embodiments, prime mover 310 is disposed on plate 302, gear boxes 344 and 345 are disposed on frame 301, and as in the embodiment of FIG. 1, operator foot platform 330 is disposed on frame 301. Fluid expansion tank 355 is provided.

Figure 4:
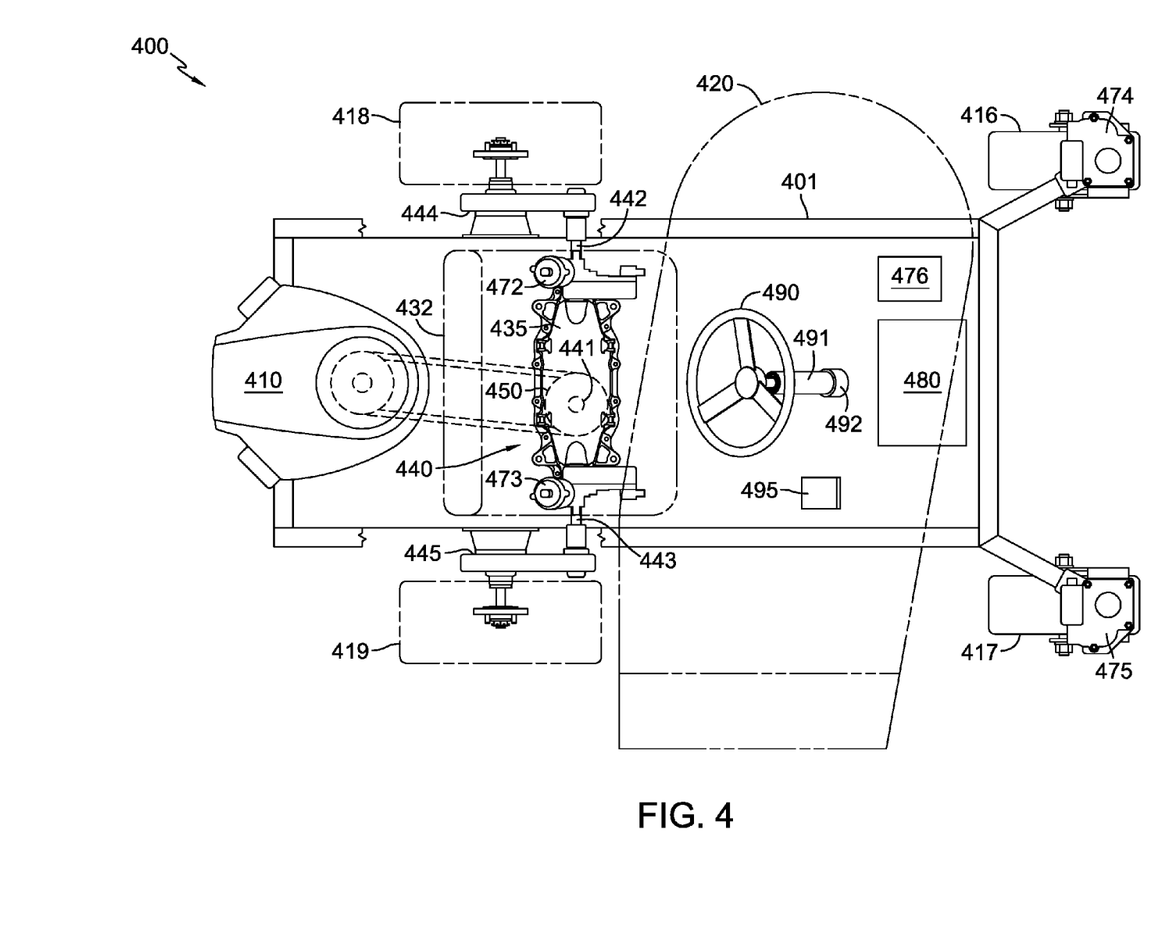
FIG. 4 is a partially schematic representation of another zero turn vehicle having a transaxle similar to that of FIG. 1 adapted for use with electronic controls and several components removed for clarity.

FIG. 4 depicts another configuration of a zero turn vehicle 400 in which a transaxle 440, similar in configuration to transaxles 140 and 340, having a single input shaft 441, a pair of independently controlled transmissions (not shown) in a single housing 435, and a pair of output shafts 442, 443 driven thereby, provide propulsion and steering to the vehicle 400. Similar to vehicle 300, the steering of vehicle 400 is electronically controlled.

Vehicle 400 differs from the previous embodiments in that the operator is carried in a seated position upon seat 432, and the prime mover 410 is mounted to vehicle frame 401 at the rear of the vehicle. As such belt and pulley assembly 450 takes on a unique orientation.

Vehicle 400 further differs from previous vehicle embodiments in that a steering wheel 490 provides operator steering inputs to a steering column 491 having a position sensor 492 in communication with controller 476. A forward/reverse operator control pedal, or rocker-style pedal 495, provides directional and speed inputs to the controller 476 via a position sensor (not shown). Controller 476, with power from power source 480, coordinates the positional adjustments of electric actuators 472, 473 on a pair of transmission control shafts (not shown) and the position adjustments of the electric actuators 474, 475 on the caster wheel assemblies 416, 417, respectively.

Figure 5:
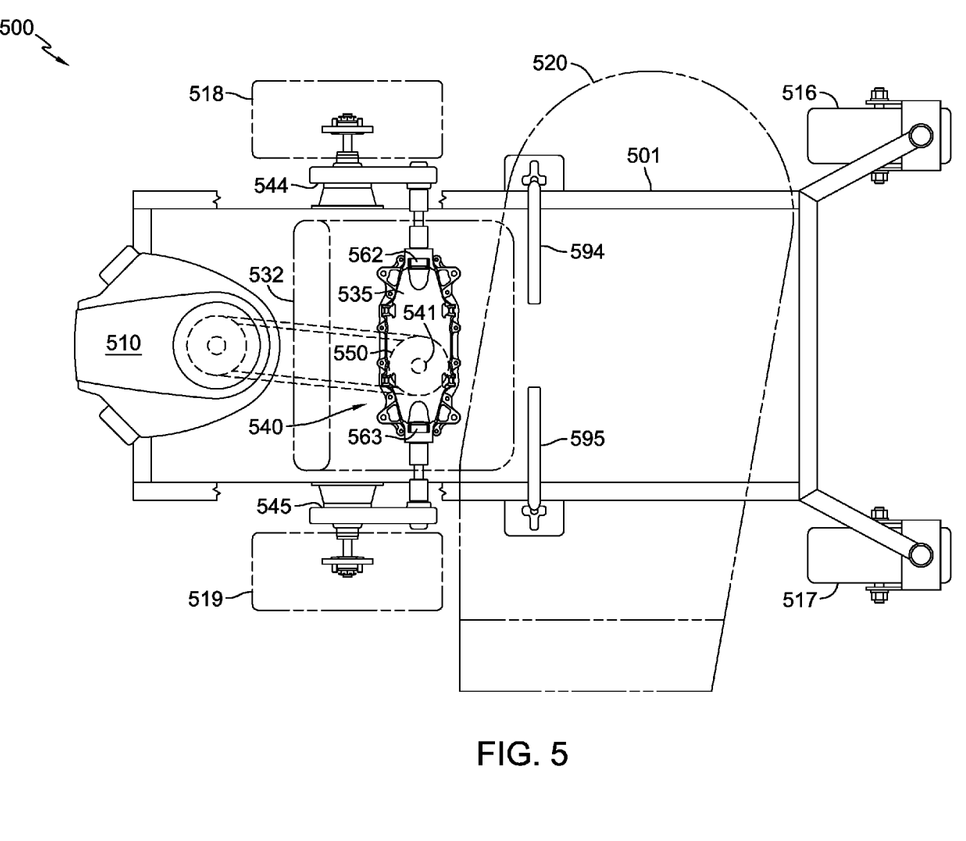
FIG. 5 is a partially schematic representation of another zero turn vehicle having a transaxle similar to that of FIG. 1 adapted for use therein and several components removed for clarity.

FIG. 5 depicts another vehicle 500 having a prime mover 510 and transaxle 540 configuration similar to vehicle 400, but varying in the manner in which the operator provides steering, speed and directional inputs to the vehicle 500. A pair of control sticks 594, 595, via mechanical linkages (not shown) to control arms 562, 563, respectively, independently provide speed and direction inputs to each of the driven wheels 518, 519, respectively. The operation of control arms 562, 563 in influencing the outputs of the independent transmissions contained within the main housing 535 of transaxle 540 is as previously described for transaxle 140. Similarly, the manner in which caster wheel assemblies 516, 517 react in response to the actions of the driven wheels 518, 519 is as described for vehicle 100.

While one or more specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of any appended claims and any equivalent thereof.

What is claimed is:

1. A zero turn vehicle, the vehicle comprising:
   a frame having a first end and a second end, and a first side extending between the first end and the second end, and a second side extending between the first end and the second end, the second side being opposite the first side;
   a pair of steerable caster wheel assemblies mounted to the frame adjacent the first end thereof;
   a mowing deck supported on the frame;
   a prime mover supported on the frame between the first end and the second end;
   a transaxle supported on the frame, wherein the transaxle is disposed between the second end of the frame and the prime mover, the transaxle comprising:
      a housing having a first side and a second side;
      an input shaft extending from the housing and driven by the prime mover,
      a first electric actuator disposed on the first side of the housing and a second electric actuator disposed on the second side of the housing;
      a first output shaft extending out the first side of the housing and controlled by the first electric actuator; and
      a second output shaft extending out the second side of the housing and controlled by the second electric actuator;
   a first gear box driven by the first output shaft, the first gear box having a first output axle extending therefrom;
   a second gear box driven by the second output shaft, the second gear box having a second output axle extending therefrom;
   wherein the housing and the first and second gear boxes generally form a U-shape, wherein the first output axle and the second output axle are both located closer to the second end of the frame than are the first output shaft and the second output shaft;

a pair of driven wheels located adjacent the second end of the frame, each of the pair of driven wheels being engaged to one of the first and second output axles;

an operator foot platform for supporting an operator of the vehicle, the operator foot platform being disposed on the frame adjacent the second end of the frame and inboard of the first gear box and the second gear box, wherein the transaxle is disposed between the prime mover and the operator foot platform; and an expansion tank disposed on the vehicle, wherein the expansion tank is located between the transaxle and the operator foot platform and between the first gear box and the second gear box.

2. The vehicle of claim 1, wherein a portion of the operator foot platform is disposed directly between the first side of the frame and the second side of the frame, and a further portion of the operator foot platform is disposed past the second end of the frame such that the further portion is not directly between the first side of the frame and the second side of the frame.

3. The vehicle of claim 1, further comprising a third electric actuator engaged to and operable to control one of the pair of steerable caster wheel assemblies, and a fourth electric actuator engaged to and operable to control the other of the pair of caster wheel assemblies.

4. The vehicle of claim 3, further comprising a controller disposed on the vehicle for controlling the first electric actuator and the second electric actuator.

5. The vehicle of claim 1, further comprising a controller disposed on the vehicle for controlling the first electric actuator and the second electric actuator, and a power source disposed on the vehicle, wherein the controller and the power source are located between the transaxle and the frame, and are located between the first gear box and the second gear box.

6. The vehicle of claim 5, wherein a portion of the operator foot platform is disposed directly between the first side of the frame and the second side of the frame, and a further portion of the operator foot platform is disposed past the second end of the frame such that the further portion is not directly between the first side of the frame and the second side of the frame.

7. A zero turn vehicle, the vehicle comprising:
a frame having a first end and a second end, and a first side extending between the first end and the second end, and a second side extending between the first end and the second end, the second side being opposite the first side;
a pair of caster wheel assemblies mounted to the frame adjacent the first end thereof;
a mowing deck supported on the frame;
a prime mover supported on the frame between the first end and the second end;
a transaxle supported on the frame, wherein the transaxle is disposed between the second end of the frame and the prime mover, the transaxle comprising:
a housing having a first side and a second side;
an input shaft extending from the housing and driven by the prime mover,
a first output shaft extending out the first side of the housing; and
a second output shaft extending out the second side of the housing;
a first gear box secured to the first side of the frame and driven by the first output shaft, the first gear box having a first output axle extending therefrom;
a second gear box driven by the second output shaft and having a second output axle extending therefrom;
wherein the housing and the first and second gear boxes generally form a U-shape, wherein the first output axle and the second output axle are both located closer to the second end of the frame than are the first output shaft and the second output shaft;
a pair of driven wheels located adjacent the second end of the frame, each of the pair of driven wheels being engaged to one of the first and second output axles; and
an operator foot platform comprising a horizontal flat plate for supporting an operator of the vehicle, the operator foot platform being disposed on the frame adjacent the second end of the frame, wherein the transaxle is disposed between the prime mover and the operator foot platform, and wherein a portion of the horizontal flat plate is disposed directly between the first gear box and the second gear box and at least the portion of the horizontal flat plate is also disposed directly between the first side of the frame and second side of the frame.

8. The vehicle of claim 7, further comprising an expansion tank disposed on the vehicle, wherein the expansion tank is located between the transaxle and the operator foot platform.

9. The vehicle of claim 7, wherein the housing of the transaxle is disposed closer to the first side of the frame than it is to the second side of the frame.

10. The vehicle of claim 9, wherein the second output shaft has a greater length than the first output shaft.

11. A zero turn vehicle, the vehicle comprising:
a frame having a first end and a second end, and a first side extending between the first end and the second end, and a second side extending between the first end and the second end, the second side being opposite the first side;
a pair of caster wheel assemblies mounted to the frame adjacent the first end thereof;
a mowing deck supported on the frame;
a prime mover supported on the frame between the first end and the second end;
a transaxle supported on the frame, wherein the transaxle is disposed between the second end of the frame and the prime mover, the transaxle comprising:
a housing having a first side and a second side;
an input shaft extending from the housing and driven by the prime mover,
a first output shaft extending out the first side of the housing;
a first electric actuator controlling the first output shaft;
a second output shaft extending out the second side of the housing; and
a second electric actuator controlling the second output shaft;
a first gear box driven by the first output shaft and having a first output axle extending therefrom;
a second gear box driven by the second output shaft and having a second output axle extending therefrom;
wherein the housing and the first and second gear boxes generally form a U-shape, wherein the first output axle and the second output axle are both located closer to the second end of the frame than are the first output shaft and the second output shaft;

a pair of driven wheels located adjacent the second end of the frame, each of the pair of driven wheels being engaged to one of the first and second output axles; and an operator foot platform for supporting an operator of the vehicle, the operator foot platform being disposed on the frame adjacent the second end of the frame and entirely inboard of the first and second gear boxes, wherein the transaxle is disposed between the prime mover and the operator foot platform; and a controller disposed on the vehicle for controlling the first electric actuator and the second electric actuator, and a power source disposed on the vehicle, wherein the controller and the power source are located between the transaxle and the operator foot platform, and are located between the first gear box and the second gear box.

\* \* \* \* \*